United States Patent
Yolleck et al.

(10) Patent No.: US 9,607,093 B2
(45) Date of Patent: *Mar. 28, 2017

(54) METHOD AND SYSTEM FOR OPERATING MULTIPLE WEB PAGES WITH ANTI-SPOOFING PROTECTION

(75) Inventors: Stephen Mark Yolleck, Sunnyvale, CA (US); David Anton Walters, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 784 days.

This patent is subject to a terminal disclaimer.

(21) Appl. No.: 13/221,394

(22) Filed: Aug. 30, 2011

(65) Prior Publication Data

US 2011/0314408 A1    Dec. 22, 2011

Related U.S. Application Data

(60) Division of application No. 11/227,274, filed on Sep. 15, 2005, now Pat. No. 8,028,245, which is a continuation-in-part of application No. 11/135,993, filed on May 24, 2005, now Pat. No. 7,523,409.

(51) Int. Cl.
G06F 3/0481    (2013.01)
G06F 17/30     (2006.01)

(52) U.S. Cl.
CPC ............... *G06F 17/30873* (2013.01)

(58) Field of Classification Search
CPC ............ H04L 63/1466; H04L 63/1441; G06K 9/00899; G06F 17/30873; G06F 2221/2119
See application file for complete search history.

(56) References Cited

U.S. PATENT DOCUMENTS

| | | | | |
|---|---|---|---|---|
| 6,049,812 A | * | 4/2000 | Bertram et al. | 715/205 |
| 6,714,970 B1 | * | 3/2004 | Fiveash et al. | 709/219 |
| 7,624,110 B2 | * | 11/2009 | Alagna et al. | |
| 7,757,088 B2 | * | 7/2010 | Abdulhayoglu | 713/175 |
| 8,079,087 B1 | * | 12/2011 | Spies et al. | 726/26 |
| 2005/0066290 A1 | * | 3/2005 | Chebolu et al. | 715/808 |
| 2005/0172229 A1 | * | 8/2005 | Reno et al. | 715/700 |
| 2006/0080735 A1 | * | 4/2006 | Brinson et al. | 726/22 |

* cited by examiner

*Primary Examiner* — Namitha Pillai
(74) *Attorney, Agent, or Firm* — Shook, Hardy & Bacon L.L.P.

(57) ABSTRACT

Method and system for operating tabbed browsing with anti-spoofing protection. Tabbed browsing operates to detect pop-up dialogs sent from malicious web pages operating in a background browser. Keystrokes and keyboard messages are prevented from being delivered to background browsers. Unauthorized movement of background browsers are detected. URLs are inspected before being saved or restored.

14 Claims, 10 Drawing Sheets

METHOD AND SYSTEM FOR OPERATING MULTIPLE WEB PAGES WITH ANTI-SPOOFING PROTECTION

CROSS-REFERENCE TO RELATED APPLICATIONS

This application is a divisional of application Ser. No. 11/227,274, filed Sep. 15, 2005, issued as U.S. Pat. No. 8,028,245, which is a continuation-in-part of prior application Ser. No. 11/135,993, filed May 24, 2005 issued as U.S. Pat. No. 7,523,409.

STATEMENT REGARDING FEDERALLY SPONSORED RESEARCH OR DEVELOPMENT

Not applicable.

TECHNICAL FIELD

The present invention relates to the field of computer software. More particularly, the present invention relates to web browsers and software add-ons to web browsers.

BACKGROUND

Today, there are several web browsers for a user to operate when accessing the Internet. These web browsers vary greatly with feature richness and functionality. Because of the variety, software manufacturers and developers understand that web browsers may determine the user's experience during operation. Therefore, software manufacturers and developers are becoming more sensitive to enhancing the user's experience in using a particular web browser.

Web browsers may be categorized into two categories, open-source web browsers and closed-source web browsers. The difference between the two browsers is that an open-source web browser has its computer source code available to the public, such as to independent software developers or third-party vendors (ISVs), while a closed-source web browser does not have its computer source code available to the public. With the open-source web browser, the public may review the computer source code, make modifications of the computer source code with the owner's approval, or create third-party computer software based on the computer source code that has been reviewed. The third-party computer software may be built with a knowledge and understanding of the computer source code of the open-source web browser. This may result in a reduced amount of software testing to ensure the functionality and integration of the third-party computer software with the open-source web browser.

As stated earlier, computer source code of the closed-source web browser is not opened to the public. The owner of the closed-source web browser has control over the modification of the computer source code. In this situation, ISVs may not review, access, nor modify the computer source code. ISVs may find it difficult to create third-party computer software, although they are allowed to create such software that works with the closed-source web browser. Usually, the resulting third-party computer software is referred to as add-on software. Because add-on software is created independently of the computer source code, more software testing may be desired to test the functionality between the add-on software and the closed-source web browser. Software testing may be more involved and rigorous to ensure the functionality and integration of the add-on software and the closed-source web browser.

Along with the evolution of web browsers, there has been an increase in software enhancements to web browsers. One of those software enhancements has been tabbed browsing. Tabbed browsing allows a user to have multiple browser views existing in one browser window. In the past, a user had to open a separate window to access a web page. Opening multiple web pages would require opening multiple windows. With tabbed browsing, multiple web pages may be opened inside of one window. The multiple web pages are identified by tabs that may be individually selected to access a particular web page.

Because of the multiple web page concept in one window, tabbed browsing may facilitate unscrupulous operators of malicious web pages into tricking a user into entering sensitive information into the malicious web page. This technique is commonly referred to as "phishing". There are a number of techniques that malicious web pages may use on an unsuspecting user operating tabbed browsing.

In one scenario, an unscrupulous operator might operate a malicious web page in a background browser. The background browser may show a popup dialog while a different (and presumably trusted) web page shows in a foreground browser. A user may be willing to respond to the popup dialog thinking it comes from the trusted site. This technique is commonly referred to as "spoofing". For example, the user may have two web pages in a tab band while operating tabbed browsing. The foreground browser may operate with a legitimate website while the background browser may operate with a malicious website. The background browser may load and show a dialog saying "Enter your login and password". The user may be currently doing some other activity, like reading email, in the foreground browser with the legitimate website. So, to the user, the popup dialog may look as if it came from the legitimate website. The user would then enter credentials that would go directly to the malicious website.

In a second scenario, again, an unscrupulous operator might operate a malicious web page in a background browser. The background browser could run a high frequency timer (say every 10 milliseconds) that continuously grabs the input focus from a foreground browser. As typing occurs, the keystrokes could go directly to the malicious website unbeknownst to a user. The malicious website could then forward the captured information as desired.

In a third scenario, again, an unscrupulous operator might operate a malicious web page in a background browser to cause the background browser to move into the visible area of the web browser. In some operations of tabbed browsing, the background browsers are not actually hidden but are moved from the visible area (moved off screen). An unscrupulous operator might use a script to move the background browser that is located out of the viewing area into the visible area of the screen or web browser. The purpose of this tactic might be to capture information from an unsuspecting user.

In a final scenario, some web browsers use security context such as zones to restrict access to resources such as the user's file system, registry, etc. When some uniform resource locators (URLs) are stored as "favorites" in a web browser and re-accessed at a later time, the security context for the URL may be lost, allowing an unsafe web page access to the resources. The security context may be lost if the user opens the URL in a tab.

Recognizing the state of the prior art, a solution is needed to overcome the problems identified above. Specifically, the solution needs to detect or mitigate "phishing" techniques to enable a user to use tabbed browsing without fear that information may be compromised or stolen.

SUMMARY

The present invention generally relates to methods and systems for operating multiple web pages with anti-spoofing protection. The present invention uses computer hardware and software, web browsers, operating systems, and internet connections to provide tabbed browsing in a web browser. Tabbed browsing provides anti-spoofing detection and mitigation for various forms of "phishing".

In accordance with the present invention, a computer-implemented method for identifying unscrupulous popup dialogs when operating a web browser with tabbed browsing is provided that includes inspecting software messages associated with browser instances operating in tabbed browsing. A browser instance is automatically repositioned from a background position to a foreground position when the browser instance provides a dialog box, a message box, another web browser, or another browser instance.

In another aspect, a computer-implemented method for preventing messages from being delivered to a browser instance in a background position when operating a web browser with tabbed browsing is provided that includes inspecting software messages associated with browser instances operating in tabbed browsing. Software messages are determined if they are a keystroke or a keyboard message. The keystroke or the keyboard message associated with the browser instance in the background position in tabbed browsing is discarded. The keystroke or the keyboard message is not processed.

In yet another aspect, a computer-implemented method for detecting unauthorized movement of a background window when operating a web browser with tabbed browsing is provided that includes inspecting software messages associated with browser instances operating in tabbed browsing. A browser instance is automatically repositioned from a background position to a foreground position when the browser instance in the background position moves or when the software messages are a set of instructions for window move messages.

In yet another aspect, a computer-implemented method for handling a malicious uniform resource locator (URL) when operating a web browser with tabbed browsing is provided that includes, during a saving of the URLs or restoring of the URLs, a validity of the URLs is verified respectively in the browser instances. The validity of the URLs is determined from a set of protocols. The saving of the URLs or the restoring of the URLs is allowed when a member of the set of protocols exists in the URLs.

In yet another aspect, computer-readable media having instructions stored thereon for facilitating tabbed browsing with anti-spoofing protection is provided that includes a tab manager, tab bar components, browser interface components that operate to provide tabbed browsing. The tab manager operates to monitor messages between an operating system and the browser interface components, to receive messages directed to the browser interface components, to verify a position of browser instances with the tab bar components, to identify spoofing from the messages, or to mitigate spoofing from the messages.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention will be better understood from the detailed description provided below and from the accompanying drawings of various embodiments of the invention, which describe, for example, method and system for operating multiple web pages with anti-spoofing protection. The detailed description and drawings, however, should not be read to limit the invention to the specific embodiments. Rather, these specifics are provided for explanatory purposes that help the invention to be better understood.

The present invention provides tabbed browsing with anti-spoofing protection. A set of tabs and buttons are located on a tab band within the browser window. Tabbed browsing operates to detect pop-up dialogs sent from malicious web pages operating in a background browser inside of tabbed browsing. Furthermore, it prevents keystrokes and keyboard messages from being delivered to background browsers, it detects unauthorized movement of background browsers, and it handles malicious uniform resource locators (URLs).

Having briefly described an overview of the present invention, an exemplary operating environment for the present invention is described below.

Exemplary Operating Environment

Figure 1:
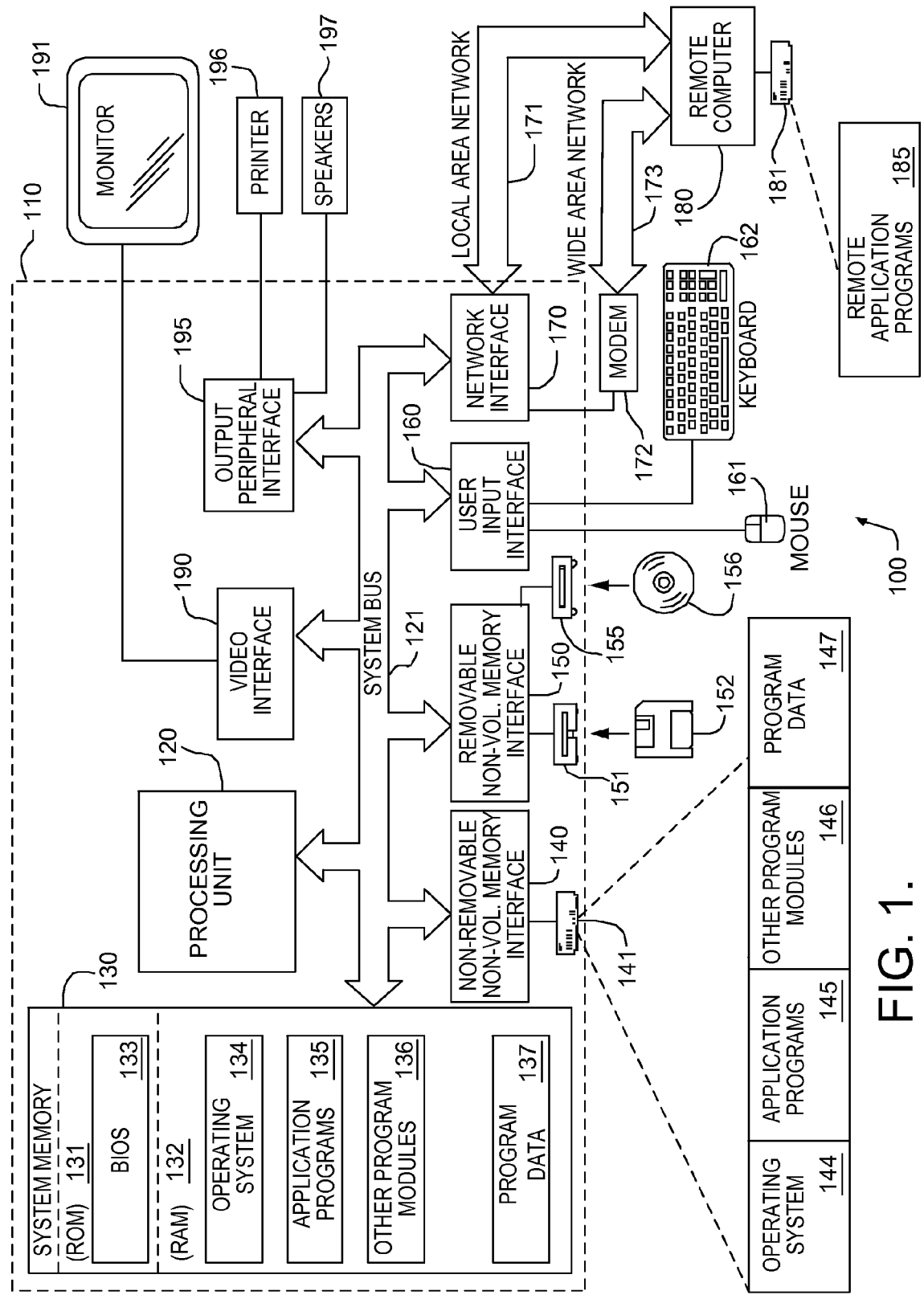
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between the various steps herein disclosed unless and except when the order of individual steps is explicitly described.

Tabbed Browsing

The present invention may be implemented using an open-source web browser or a closed-source web browser. Software may be created in a number of ways to work with either browser to implement the present invention. More specifically, the present invention discusses implementations of an embodiment whereby software is created without requiring access to the source code of the web browser to implement tabbed browsing. The software may be created to function as a plug-in to the browser.

Figure 2A:
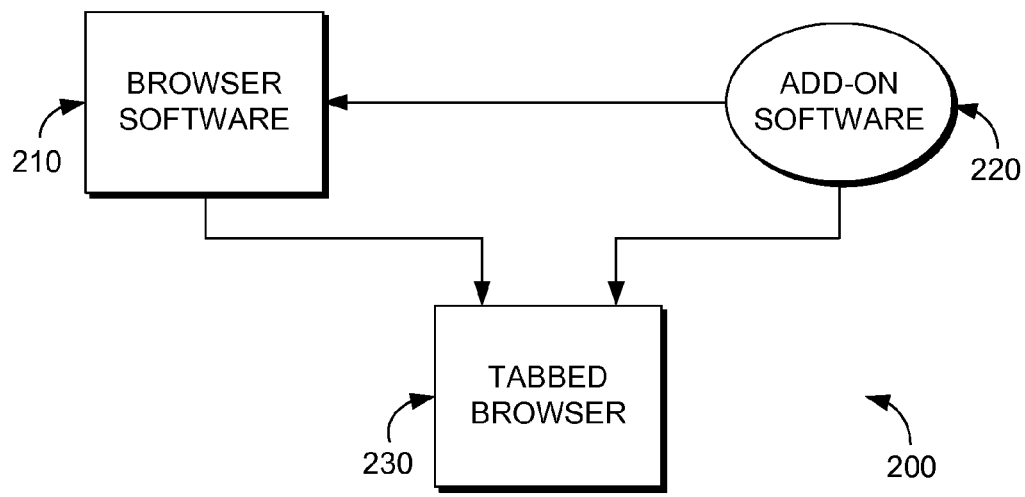
FIGS. 2A and 2B are block diagrams of a software environment suitable for practicing an embodiment of the present invention.

In FIG. 2A, a block diagram is shown illustrating a browser software 210, an add-on software 220, and a tabbed browser 230. The present illustration shows an embodiment whereby add-on software 220 may be created without requiring access to the source code of browser software 210. The combination of browser software 210 and add-on software 220 results in tabbed browser 230. Add-on software 220 operates by registering as a plug-in with browser software 210. During this registration process, browser software 210 recognizes add-on software 220 and may allow add-on software 220 to manipulate software in browser software 210 to provide additional features in the web browser, namely tabbed browsing.

The terms add-on, extension, and plug-in software may be used in this document interchangeably. These terms refer to software that is either added to existing software, compiled with existing software, or executed with existing software to augment the existing software or to operate currently with the existing software to provide a feature enhancement.

Figure 2B:
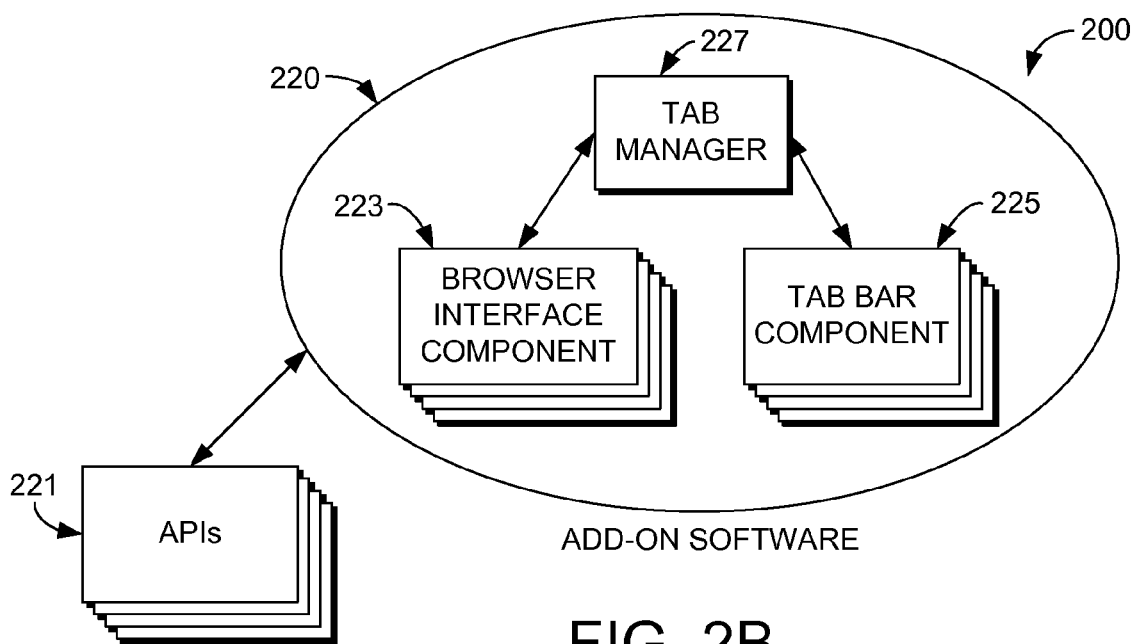

In order to configure tabbed browser 230 from the combination of browser software 210 and add-on software 220, add-on software 220 may use a set of application programming interfaces (APIs) 221 as shown in FIG. 2B to interface with a web browser at browser software 210. Add-on software 220 may contain a browser interface component 223, a tab bar component 225, and a tab manager 227.

Add-on software 220 may contain one or more browser interface components 223. Each browser interface component 223 controls a browser instance that exists in a browser window. A browser instance looks like a browser window but contains a corresponding tab located on a tab bar. The number of browser instances opened in one browser window may be identified by the number of tabs located in the tab bar.

Add-on software 220 may contain one or more tab bar components 225. Tab bar component 225 manages the tab bar that appears in the web browser. Tab bar component 225 may control user-selectable buttons and the tabs that may appear on the tab bar. This control may include the size and shape of the buttons and tabs as well as the location of the buttons and tabs on the tab bar.

Tab manager 227 exists to control a set of browser interface components 223 and a set of tab bar components 225 that may exist in add-on software 220. Tab manager 227 controls which browser interface component 223 and tab bar component 225 is associated with a particular browser window. For example, a user may have two browser windows open with five browser instances opened in the first browser window and three browser instances opened in the second browser window. Add-on software 220 would operate to contain eight browser interface components 223 along with two tab bar components 225 and one tab manager 227. Five of the eight browser interface components 223 and one tab bar component 225 would be associated to the first browser window while three of the remaining eight browser interface components 223 and the other tab bar component 225 would be associated to the second browser window. Tab manager 227 would manage the various software components keeping them associated to the correct browser windows.

APIs are computer software programs that operate to interface with other computer software programs or computer systems. APIs may be developed for various applications depending on the intent of the software developer. In FIG. 2B, APIs 221 may be used with other computer software to provide tabbed browsing functionality as described earlier. The APIs provide various interfaces to perform various functions, such as controlling a window handle, facilitating browser control, or controlling browser navigation. This list of functions for APIs is by no means limited to the ones described. Many different types of APIs may be used to implement an embodiment of the present invention. One may note that APIs may function at the operating system level as well as at the browser level.

Figure 3:
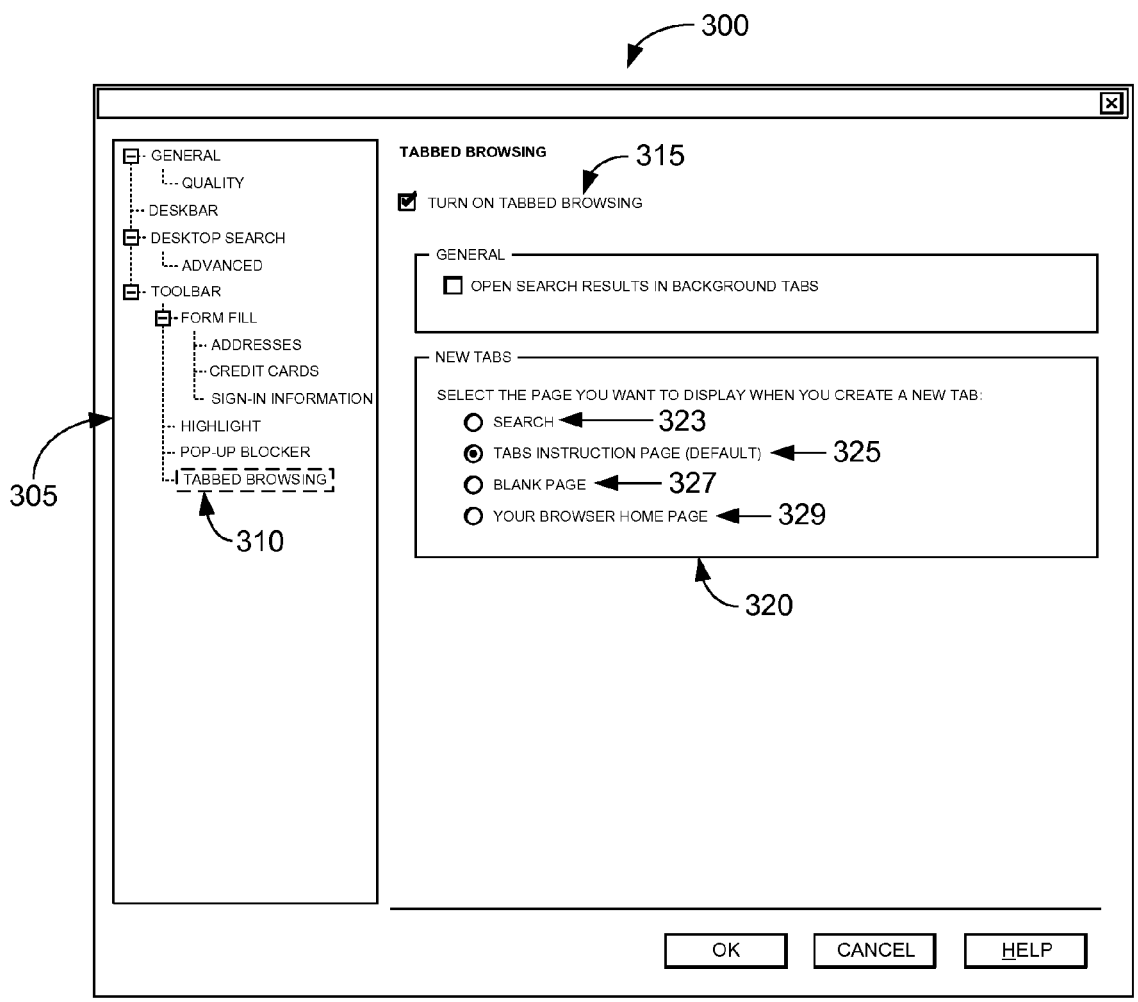
FIG. 3 is a block diagram of an exemplary operating environment illustrating an embodiment of the present invention.

Referring now to FIG. 3, a block diagram is shown illustrating an exemplary operating environment in a configuration page 300. Configuration page 300 illustrates information that may be provided when browser software 210 and add-on software 220 operates together. Configuration page 300 contains options for tabbed browsing with an outline window 305, a tabbed browsing entry 310, a tabbed browsing selection 315, and a new tabs window 320. New tabs window 320 contains a search selection 323, a tabs instruction page selection 325, a blank page selection 327, and a browser home page selection 329.

Configuration page 300 is merely exemplary for an implementation of an embodiment of the present invention. Configuration page 300 may be changed to show other information as desired by one implementing the present invention.

Outline window 305 contains an entry for tabbed browsing indicated by tabbed browsing entry 310. Tabbed browsing entry 310 may be selected with a pointing device, such as a mouse pointer, connected to a computing device to show information illustrated next to outline window 305. The information relates to tabbed browsing and provides various options that may be selected or modified related to tabbed browsing.

Tabbed browsing selection 315 provides a selectable box as an option to turn on or turn off tabbed browsing. New tabs window 320 provides various information related to tabs such as the initial display of web pages when a new tab is created. In new tabs window 320, a user has the option to select the initial web page to be created when a new tab is selected during the operation of tabbed browsing. The present invention illustrates four selections identified by search selection 323, tabs instruction page selection 325, blank page selection 327, and browser home page selection 329. However, other embodiments of the present invention may provide different selections in new tabs window 320.

Figure 4:
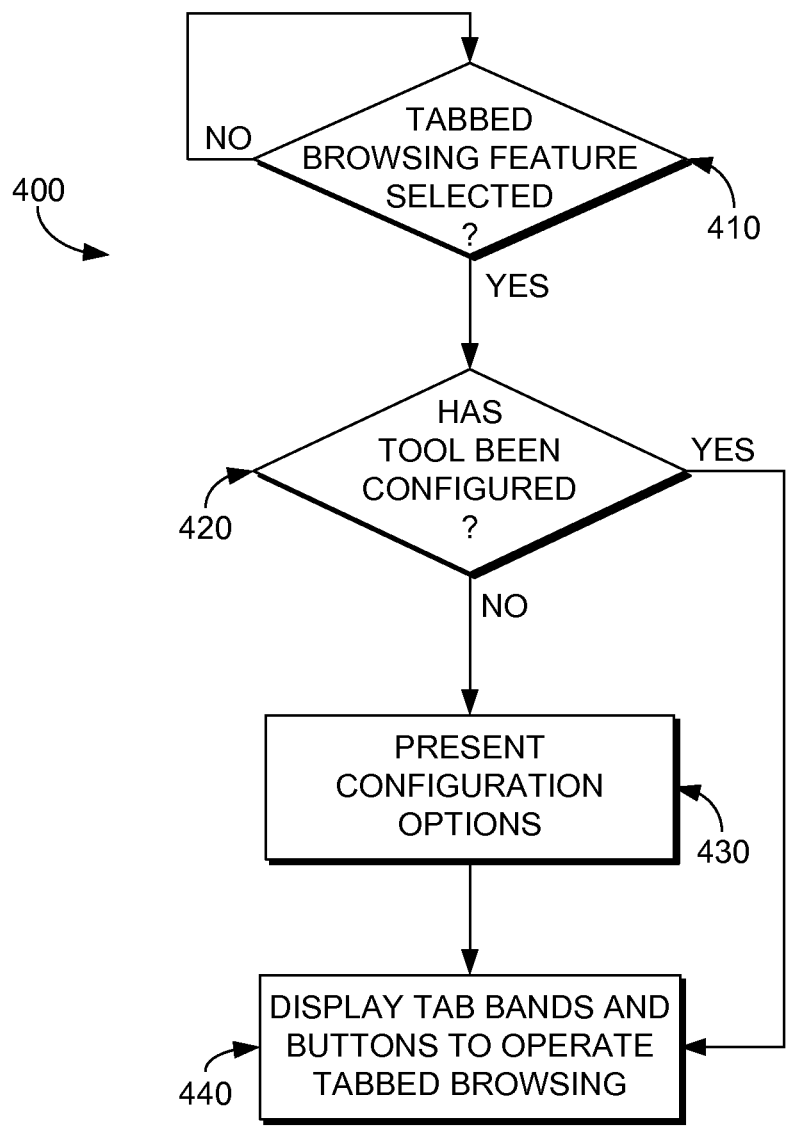
FIG. 4 is a flowchart illustrating an exemplary process for configuring tabbed browsing in accordance with an embodiment of the present invention.

Corresponding to FIG. 3 is a method 400 for configuring tabbed browsing illustrated in FIG. 4. This method assumes that a user is operating a computing device and a web browser that has installed add-on software 220 as a plug-in to get tabbed browser 230. The user may operate tabbed browsing by determining first if the tabbed browsing feature has been selected in a step 410. This step is similar to accessing configuration page 300 and selecting the box associated with tabbed browsing selection 315. Tabbed browsing may need to be configured as stated in a step 420. If tabbed browsing is not configured, configuration options may be presented in a step 430. A user may configure tabbed browsing as illustrated in new tabs window 320. If tabbed browsing has been configured, tabs and buttons may be shown in a tab band in a browser window in a step 440.

Figure 5A:
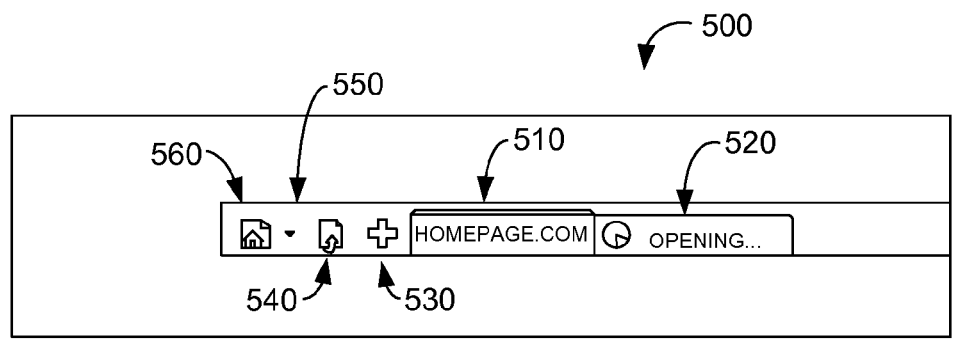
FIGS. 5A and 5B are block diagrams of exemplary tab bands illustrating an embodiment of the present invention.
Figure 5B:
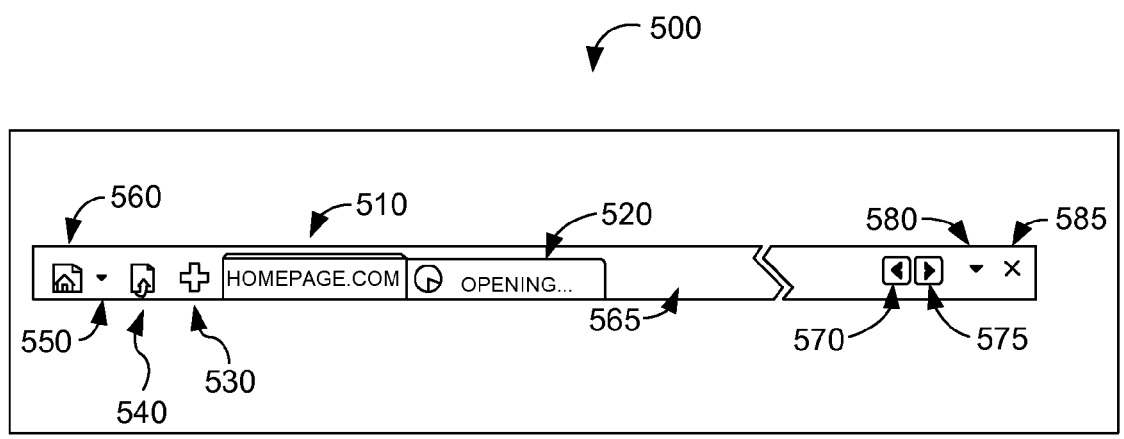

Once a user has selected the options that are desired to operate tabbed browsing, the user may see a tab band 500 as illustrated in FIGS. 5A and 5B. FIGS. 5A and 5B show an exemplary illustration of a tab band that appears when tabbed browsing is activated. FIG. 5A contains a foreground tab 510, a background tab 520, a new tab button 530, a quick tab button 540, a first menu 550, and a my routine button 560. The tabs and buttons shown in tab band 500 are exemplary for implementing an embodiment of the present invention and are not meant to be the only tabs and buttons that may be implemented with the present invention. Other embodiments of the present invention may implement a different setup than the one shown, and may implement different tabs and buttons from the ones shown. Furthermore, tab band 500 contains dynamic information that may change during the operation of tabbed browsing. The number of tabs, the headings in the tabs, and the size of the tabs may change depending on the number of web pages that are opened.

In FIG. 5A, foreground tab 510 shows a tab for an exemplary web page identified as homepage.com. Foreground tab 510 corresponds to a web page being viewed by a user. Foreground tab 510 shows an active tab which is slightly more prominent in appearance in the list of tabs on tab band 500 than the other tabs. Foreground tab 510 changes position on tab band 500 whenever a user selects a different tab to view the corresponding web page. Whenever a subsequent tab is selected, that tab becomes foreground tab 510 with its corresponding web page being shown and the previous tab becomes background tab 520. Typically, there is usually one foreground tab 510 as illustrated in FIGS. 5A and 5B. However, it is possible to implement other embodiments of the present invention to contain more than one foreground tab 510.

Background tab 520 corresponds to the tabs on tab band 500 that are not foreground tab 510. Background tab 520 may vary in number and are less prominent in appearance in the list of tabs on tab band 500 than foreground tab 510. Like foreground tab 510, background tab 520 corresponds to a web page. However, the web page is not currently being viewed by the user. If the user selects background tab 520, the tab becomes foreground tab 510 and the previous foreground tab 510 becomes background tab 520.

A user may desire to create new tabs on tab band 500. The user may select new tab button 530 to create a tab on tab band 500 along with an associated web page. The type of web page that may open when new tab button 530 is selected depends on the configuration options that may have been selected in new tabs window 320 in FIG. 3. The user may create new tabs with new tab button 530 as desired.

A user may desire to use quick tab button 540 to create new tabs and open new web pages whenever a hyperlink is selected on the currently active web page. Quick tab button 540 may be selected and may remain in a slightly depressed position in appearance to show that it is activated. When this happens, a selection of a hyperlink on a web page may cause a new tab to appear on tab band 500 with a new web page containing the information associated with the hyperlink. Correspondingly, a subsequent selection of quick tab button 540 after it has first been selected may cause quick tab button 540 to become deactivated. When this happens, quick tab button 540 may raise in appearance to its former position as a button on tab band 500. This appearance may alert a user that the feature is deactivated.

In FIG. 5B, the same tab band 500 is shown with an extended view of information that may be provided on the right side of tab band 500. In FIG. 5B, a scroll left button 570, a scroll right button 575, a second menu 580, and a close button 585 are shown. These are some examples of the buttons that may be implemented with the present invention to provide functionality that may be desired. As stated earlier, other buttons, menus, and tabs may be provided to implement other embodiments of the present invention. One skilled in the art may change the operations of the buttons and tabs to suit particular needs.

Figure 6:
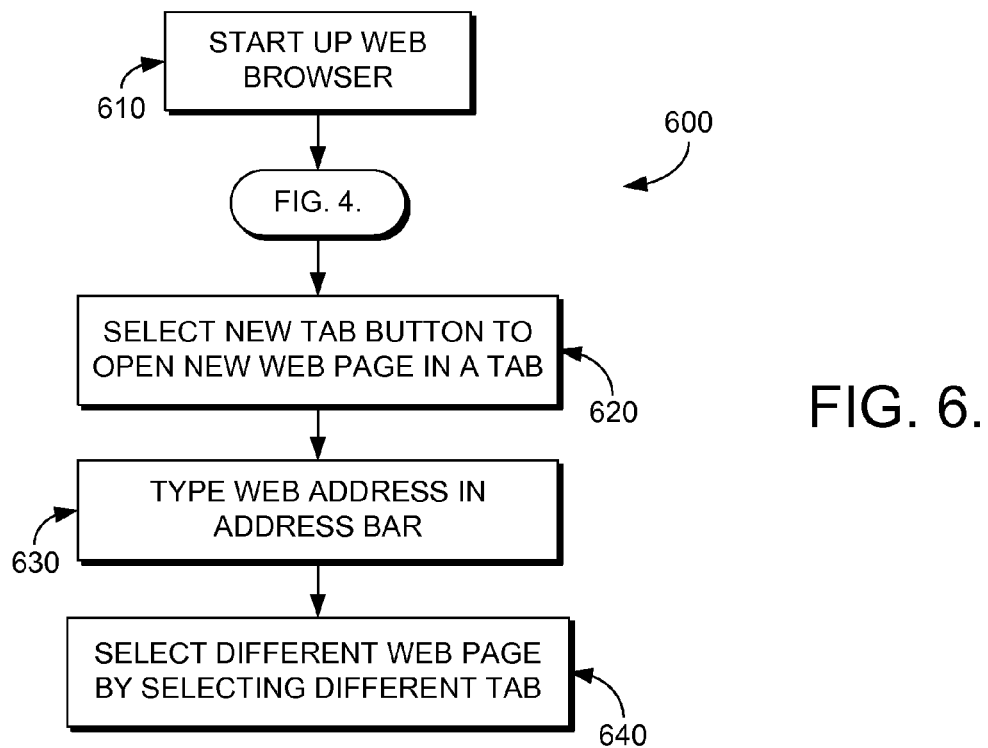
FIG. 6 is a flowchart illustrating an exemplary process for operating tabbed browsing in accordance with an embodiment of the present invention.
Figure 7:
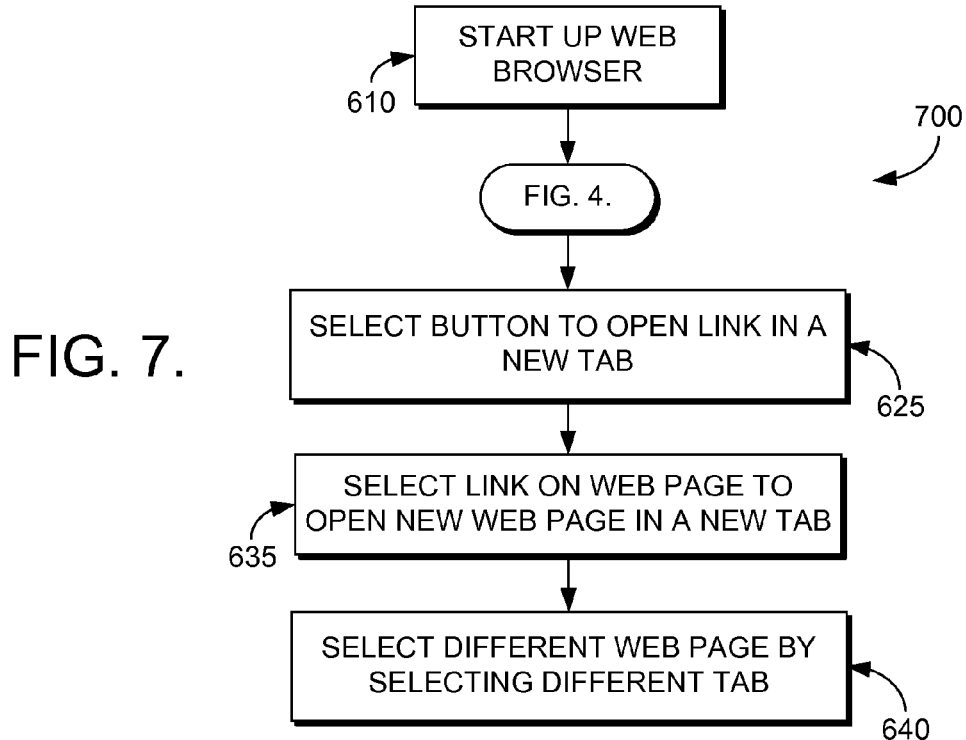
FIG. 7 is a flowchart illustrating an exemplary process for operating tabbed browsing in accordance with an embodiment of the present invention.

Now turning to FIGS. 6 and 7, methods 600 and 700 are shown for operating tabbed browsing. In FIGS. 6 and 7, a web browser is opened at a computing device as shown in a step 610. Then, a determination is made whether tabbed browsing has been activated as shown by the icon containing FIG. 4. FIG. 4 was discussed earlier as the process for activating and configuring tabbed browsing.

In FIG. 6, a step 620 illustrates selecting new tab button to open a new web page in a tab. This corresponds to new tab button 530 discussed in FIGS. 5A and 5B. The new web page may appear in accordance with the option selected in new tabs window 320 in FIG. 3 discussed earlier. After the new web page appears, a user may type a desired web address in the address bar as shown in a step 630.

In FIG. 7, a step 625 illustrates selecting a button to open a link in a new tab. This corresponds to quick tab button 540 also discussed in FIGS. 5A and 5B. A user may select a link (also described earlier as a hyperlink) on the active web page to open a new web page in a new tab in a step 635. Although not described in FIG. 7 but discussed earlier, the same button selected in step 625 to activate the feature of step 635 may be selected again to deactivate the feature. One ordinarily skilled in the art may note that there are other ways of opening a link in a new tab including right-clicking on a hyperlink using a pointer device to open a new tab, or holding down the Alt button on the keyboard of a computing device while clicking on a hyperlink using the pointer device.

In both FIGS. 6 and 7, a user may select different web pages by selecting different tabs in a step 640. The tabs may be selected with either a pointing device such as a mouse pointer or keystrokes on a keyboard connected to the computing device. As discussed throughout the figures, by selecting a tab, a web page appears in the browser window. If a different tab is selected, a different web page appears over the previous web page.

As noted above, the present invention may be implemented with either a closed-source web browser or an open-source web browser. Examples of commercially-available web browsers include the closed-source web browser known as INTERNET EXPLORER from the Microsoft Corporation of Redmond, Wash. and the open-source web browser known as MOZILLA FIREFOX of the Mozilla Foundation of Mountain View, Calif.

A scenario may be described using the closed-source web browser (browser software 210) known as INTERNET EXPLORER and tabbed browsing software (add-on software 220). Tabbed browsing software is executed to operate with the web browser as a plug-in called a browser helper object. While loaded, the tabbed browsing software receives browser events. A tab bar (tab band 500) is created and displayed above the browser window with a tab (foreground tab 510 and background tab 520) after tab browsing is configured (configuration page 300). The tab may show a user's home page or other web page.

As the user navigates, the tab title changes to the corresponding web page title. A right-mouse click on a tab may provide a web page navigation history for that particular tab. As the user requests new web pages (steps 620 or 635), tabbed browsing software may allow the creation of new tabs and web pages which may be called browser instances in the browser window. As stated earlier, a browser instance looks like a browser window but contains a corresponding tab located on the tab bar. Subsequent tabs are shown on the tab bar with previous tabs (FIGS. 5A and 5B). The number of browser instances opened in one browser window may be identified by the number of tabs located in the tab bar.

When a second browser instance is opened with a new tab, the previous first browser instance is hidden. The second browser instance is repositioned using the same coordinates as the now hidden first browser instance. As stated earlier, a new tab is added to the tab bar for a new browser instance. The tab bar is shown above the second browser instance maintaining visibility to the user. If the user clicks the first tab, the hidden first browser instance of the web browser reappears on top of the second browser instance which moves off the screen. The tab bar remains visible with the first browser instance.

Whenever the user accesses a tab, the corresponding browser instance operates with compatibility and functionality to existing features in the web browser. This means that toolbars, status bars, and menus are accessible with each browser instance in tabbed browsing. An additional functionality of tabbed browsing is that the user may de-activate tabbed browsing (configuration page 300) or remove the software completely (add-on software 220).

Tabbed Browsing with Anti-Spoofing Protection

Figure 8:
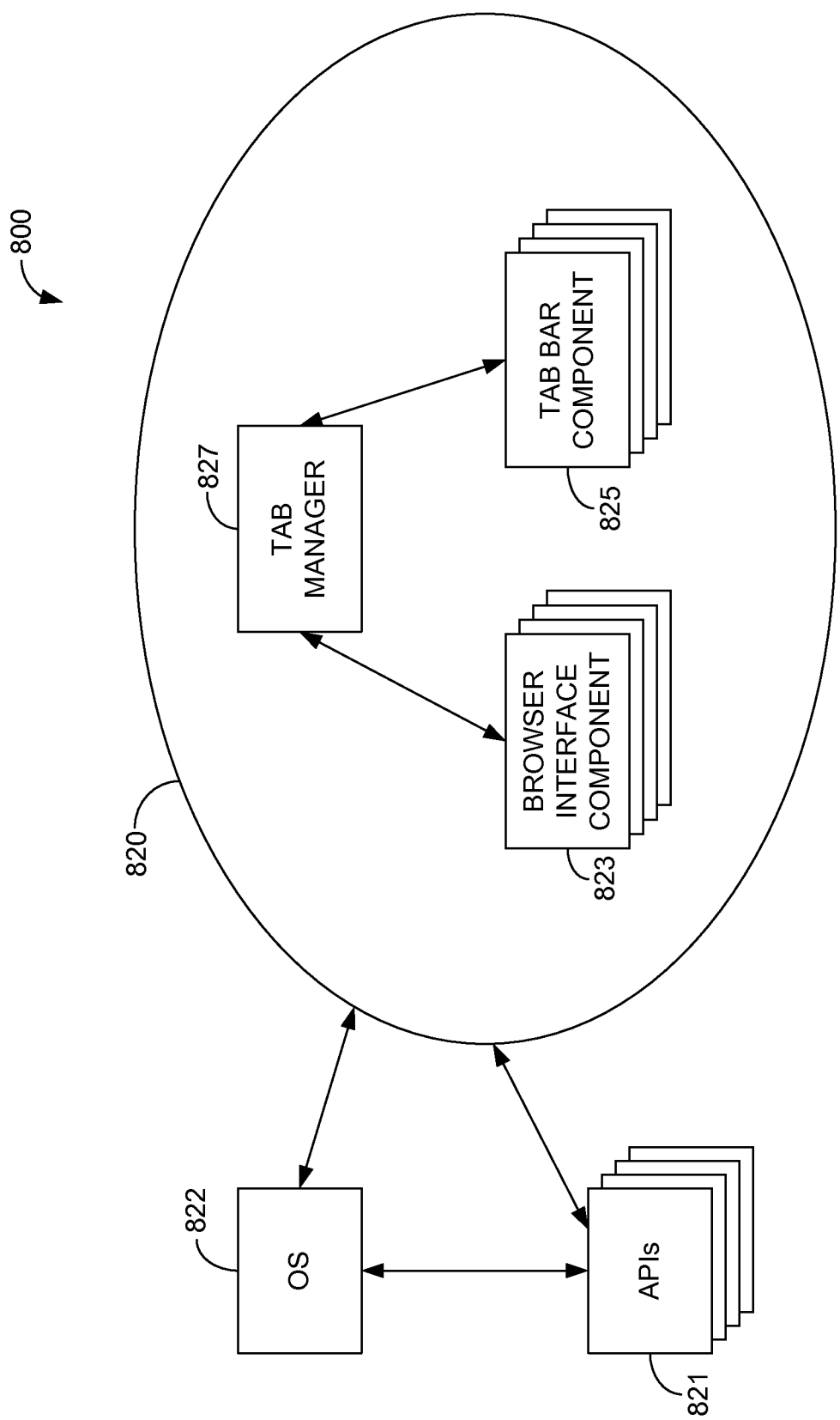
FIG. 8 is a block diagram of a software environment suitable for practicing an embodiment of the present invention.

In FIG. 8, a block diagram of an operating environment 800 is shown with an add-on software 820, a set of application program interfaces (APIs) 821, and an operating system (OS) 822. Add-on software 820, APIs 821, and OS 822 operate together to provide tabbed browsing as discussed above in FIG. 2B. Add-on software 820 may include a set of browser interface components 823, a set of tab bar components 825, and a tab manager 827.

As shown, the components in FIG. 8 are similar to those shown in FIG. 2B. However, FIG. 8 focuses on tabbed browsing with anti-spoofing protection. For example, tab manager 827 may instruct OS 822, using APIs 821, to re-direct messages destined for browser interface components 823 to tab manager 827. This re-direction enables tab manager 827 to monitor messages that are being sent to browser interface components 823. This would include messages received as user input as well as inputs provided by APIs 821, OS 822, and other computer software operating in OS 822's environment. The re-direction also enables tab manager 827 to monitor software messages sent by browser interface components 823. If a browser instance sends a message, tab manager 827 would be able to intercept the message based on the message being associated with a member in browser interface components 823. For example, if a browser instance sends a message to create a dialog, tab manager 827 would be able to intercept the message for the corresponding member associated with browser interface components 823.

Without anti-spoofing protection, tab manger 827 would not call for the re-direction of messages destined for browser interface components 823. Tab manager 827 would function as tab manager 227 in FIG. 2B.

Tab manager 827 may inspect messages destined for browser interface components 823 to determine if keyboard inputs are being provided to a browser instance by a user.

Whenever the user types on a keyboard, the inputs are transmitted to the browser instance. If keyboard inputs are being received by the browser instance, tab manager 827 may interact with tab bar components 825 to determine which browser instance is receiving the keyboard inputs. Tab bar components 825 tracks the browser instances and knows the position of each browser instance. Tab manager 827 wants to determine if the browser instance is in a foreground position on the user's screen or in a background position. If the browser instance is in the foreground position, it may be presumed that the user desires to interact with the browser instance. However, if the browser instance is in the background position, the user may not be aware that the keyboard inputs are going to the browser instance in the background position. In this case, tab manager 827 may intervene to intercept the keyboard input or discard the keyboard inputs.

In implementing another embodiment of the present invention, tab manager 827 may verify a validity of a URL prior to the URL being saved in a folder or restored from the folder, either on an individual basis or as part of a group of URLs. Tab manager 827 may verify messages to and from browser interface components 823 to verify if a URL is valid. In one embodiment of the present invention, tab manager 827 may filter messages and allow a set of protocols to be saved or restored. The set of protocols might include http, https, ftp, about, and file. However, this set may be expanded or restricted based upon the particular implementation of the present invention.

If a URL does not contain a member of the set of protocols, tab manager 827 may block the URL from being saved or restored. The present invention implements these techniques to prevent various websites from gaining access to restricted areas on a computing device. The restricted area might include such areas as operating systems files, a registry, or data files.

Figure 9:
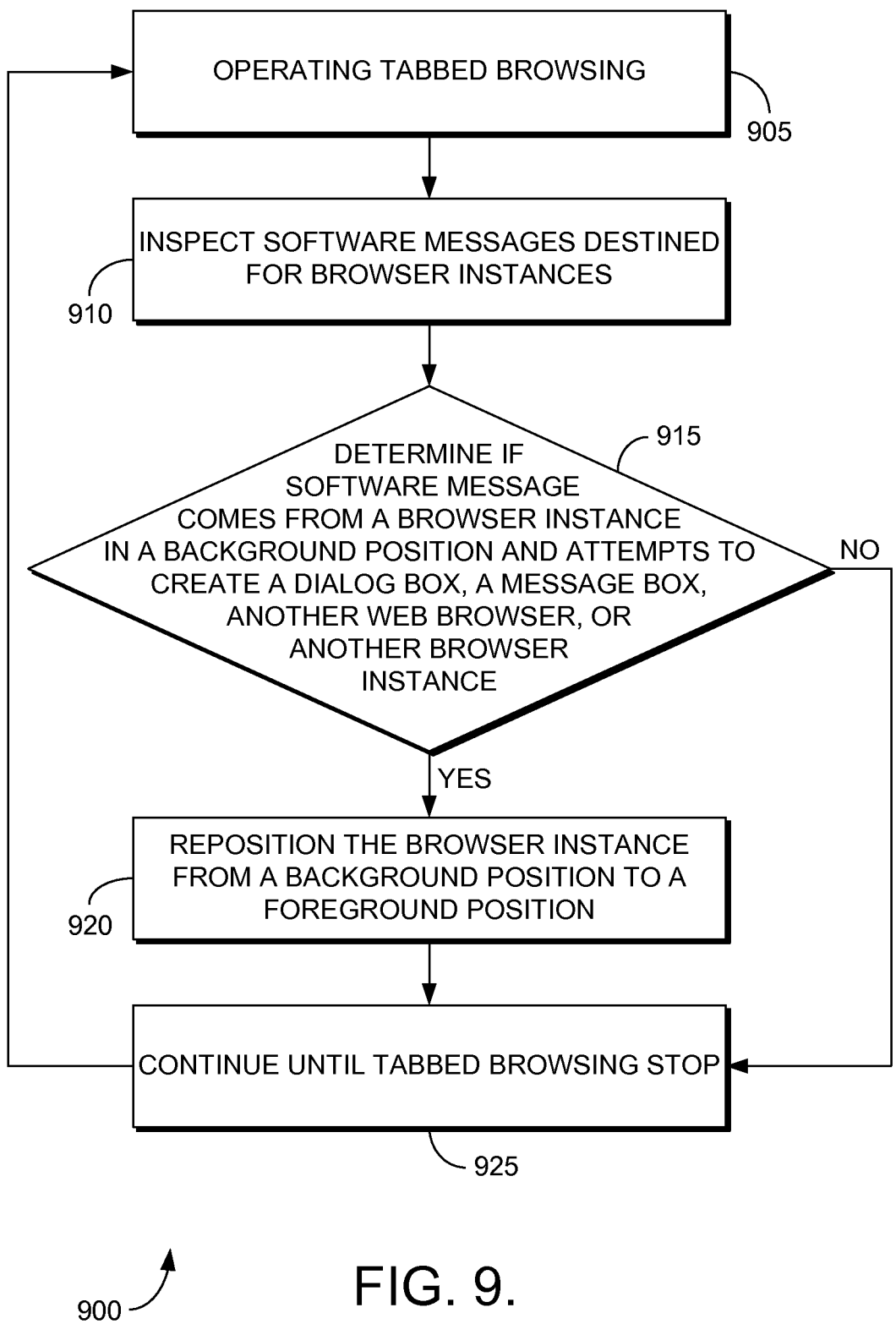
FIG. 9 is a flowchart illustrating an exemplary process for operating tabbed browsing with anti-spoofing protection in accordance with an embodiment of the present invention.

Turning now to FIG. 9, a process for operating tabbed browsing with anti-spoofing protection is shown in a method 900. Method 900 begins with the operation of tabbed browsing in a step 905. The computer software for tabbed browsing, identified above as add-on software 820, inspects software messages destined for browser instances in a step 910. The inspection occurs with tab manager 827 and browser interface components 823 interacting with APIs 821 and OS 822. In a step 915, a determination is made if a software message comes from a browser instance in a background position and the browser instance attempts to create a dialog box, a message box, another web browser, or another browser instance. If the determination is no, tabbed browsing continues to operate until stopped in a step 925. If the determination is yes, tabbed browsing repositions the browser instance from the background position to a foreground position in a step 920. This technique provides a way to alert the user that the dialog box, the message box, the web browser, or the new browser instance that is created belongs to the browser instance that is brought to the foreground. After step 920, tabbed browsing continues to operate until stopped in step 925.

Figure 10:
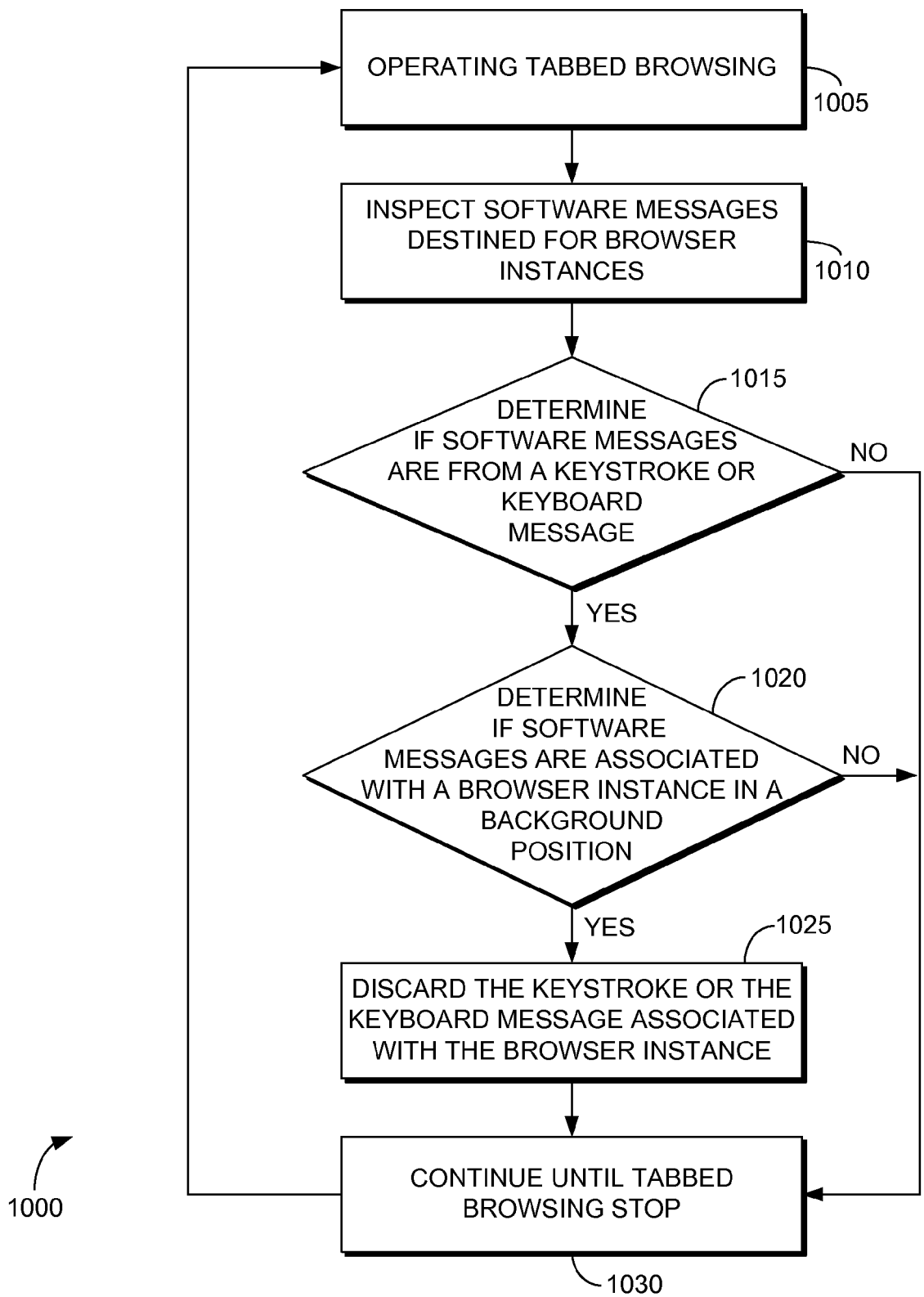
FIG. 10 is a flowchart illustrating another exemplary process for operating tabbed browsing with anti-spoofing protection in accordance with an embodiment of the present invention.

In FIG. 10, another process for operating tabbed browsing with anti-spoofing protection is shown in a method 1000. Method 1000 begins like method 900 with the operation of tabbed browsing in a step 1005. Method 1000 inspects software messages destined for browser instances in a step 1010. In a step 1015, a determination is made if software messages are from a keystroke or keyboard message. If the determination is no, tabbed browsing continues to operate until stopped in a step 1030. If the determination is yes, another determination is made if the software messages are associated with a browser instance in a background position in a step 1020. Again, if the determination is no, tabbed browsing continues to operate until stopped in a step 1030. If the determination is yes, tabbed browsing discards the keystroke or the keyboard message associated with the browser instance in a step 1025. This technique provides a way to prevent the inputs from an unsuspecting user from going to a web page that may be hidden or partially obscured from view. After step 1025, tabbed browsing continues to operate until stopped in step 1030.

Figure 11:
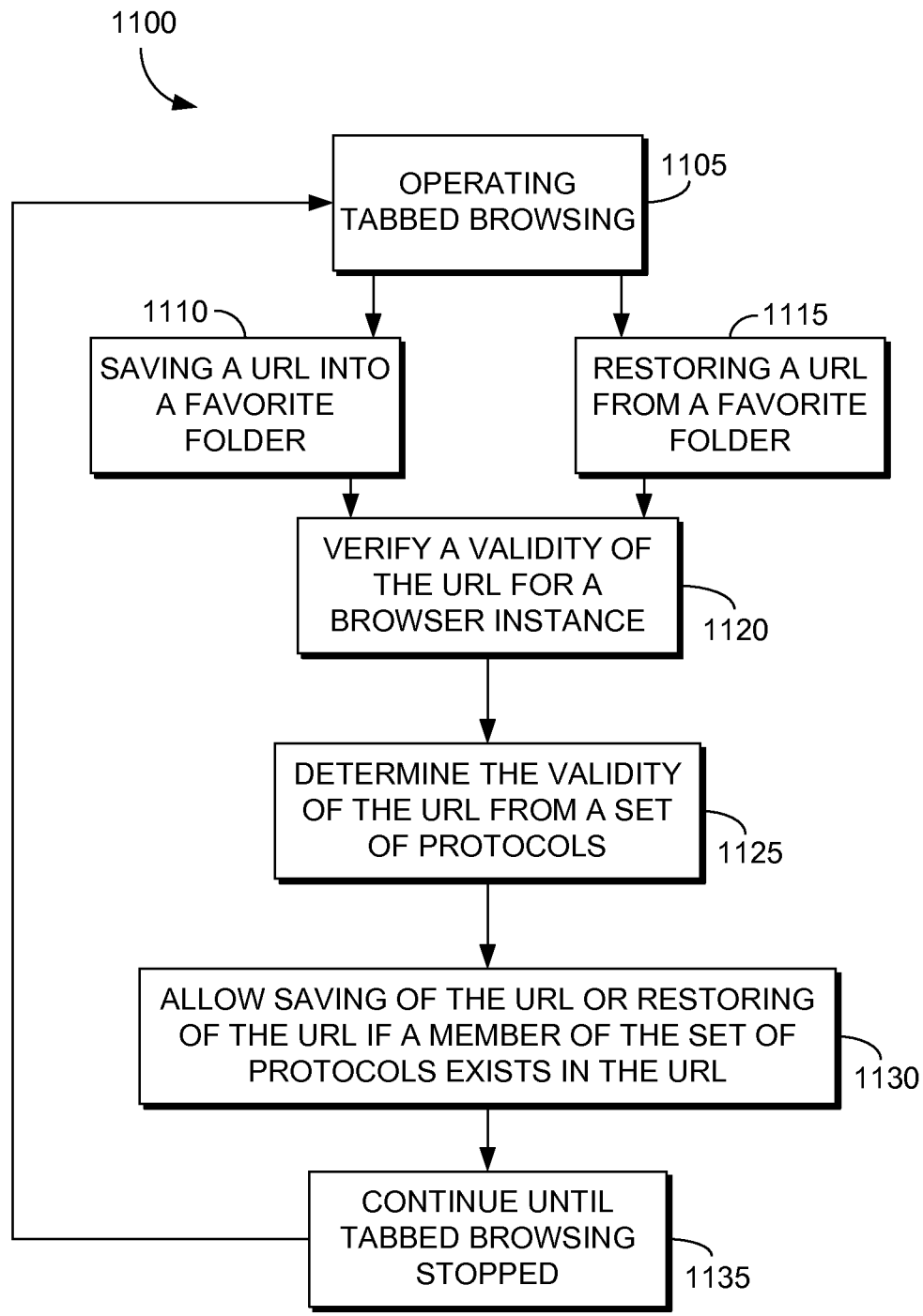
FIG. 11 is a flowchart illustrating yet another exemplary process for operating tabbed browsing with anti-spoofing protection in accordance with an embodiment of the present invention.

Turning now to FIG. 11, yet another process for operating tabbed browsing with anti-spoofing protection is shown in a method 1100. Method 1100 begins like methods 900 and 1000 with the operation of tabbed browsing in a step 1105. In a step 1110, a user may attempt to save a URL into a favorite folder while in a step 1115, the user may attempt to restore a URL that has been previously saved. With either attempts in steps 1110 and 1115, the URL associated with a browser instance is verified for a validity in a step 1120. The validity is determined by the existence of a set of protocols in a step 1125. As discussed above, the set of protocols may change but may include the protocols of http, https, ftp, about, and file. In a step 1130, the URL is allowed to be saved or restored if the URL contains a member of the set of protocols. For example, if the URL begins with http, https, ftp, about, or file, then the URL may be deemed safe to save or restore. This technique provides a way to prohibit or restrict access to the computing device. By preventing the saving or restoring of the URL that does not contain a particular protocol, a malicious URL may be prevented from operating on the computing device to engage in malicious activity as discussed above. After step 1130, tabbed browsing continues to operate until stopped in step 1135.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer-implemented method for facilitating tabbed browsing with anti-spoofing protection, comprising:
    inspecting one or more software messages associated with one or more browser instances operating in tabbed browsing wherein the one or more browser instances are located in a single web browser and wherein each of the one or more browser instances is a browser view with its own selectable tab located on a tab bar;
    determining that an untrusted browser instance in a background position provides at least one of a dialog box, a message box, another web browser, and another browser instance in a foreground position; and
    automatically repositioning the untrusted browser instance from the background position to the foreground position when the browser instance provides at least one of the dialog box, the message box, the another web browser, and the another browser instance.

2. The method of claim 1, further comprising inspecting the one or more software messages by one or more computer programs not associated with tabbed browsing.

3. The method of claim 1, wherein the browser instance is a browser window with a web browsing functionality associated with a tab on a tab band wherein the one or more browser instances are uniquely connected respectively to one or more tabs and wherein a selection of the tab repositions respectively the browser instance to the foreground position.

4. The method of claim 3, wherein inspecting the one or more software messages comprises monitoring an activity of the one or more browser instances located in the background position.

5. A computer system having a processor, a memory and an operating environment, the computer system operable to execute the method as recited in claim 3.

6. One or more computer-readable storage media having instructions stored thereon for performing the method of claim 3.

7. A computerized system comprising:
one or more processors; and
one or more computer storage media storing computer-useable instructions that, when used by the one or more processors, cause the one or more processors to perform operations comprising:
inspecting one or more software messages associated with one or more browser instances operating in tabbed browsing wherein the one or more browser instances are located in a single web browser and wherein each of the one or more browser instances is a browser view with its own selectable tab located on a tab bar,
determining that an untrusted browser instance in a background position provides at least one of a dialog box, a message box, another web browser, and another browser instance in a foreground position, and
automatically repositioning the untrusted browser instance from the background position to the foreground position when the browser instance provides at least one of the dialog box, the message box, the another web browser, and the another browser instance.

8. The system of claim 7, further comprising inspecting the one or more software messages by one or more computer programs not associated with tabbed browsing.

9. The system of claim 7, wherein the browser instance is a browser window with a web browsing functionality associated with a tab on a tab band wherein the one or more browser instances are uniquely connected respectively to one or more tabs and wherein a selection of the tab repositions respectively the browser instance to the foreground position.

10. The system of claim 9, wherein inspecting the one or more software messages comprises monitoring an activity of the one or more browser instances located in the background position.

11. One or more computer-readable hardware memory having computer-executable instructions embodied thereon that, when executed, perform a method for facilitating tabbed browsing with anti-spoofing protection, the method comprising:
inspecting one or more software messages associated with one or more browser instances operating in tabbed browsing wherein the one or more browser instances are located in a single web browser and wherein each of the one or more browser instances is a browser view with its own selectable tab located on a tab bar;
determining that an untrusted browser instance in a background position provides at least one of a dialog box, a message box, another web browser, and another browser instance in a foreground position; and
automatically repositioning the untrusted browser instance from the background position to the foreground position when the browser instance provides at least one of the dialog box, the message box, the another web browser, and the another browser instance.

12. The method of claim 11, further comprising inspecting the one or more software messages by one or more computer programs not associated with tabbed browsing.

13. The method of claim 11, wherein the browser instance is a browser window with a web browsing functionality associated with a tab on a tab band wherein the one or more browser instances are uniquely connected respectively to one or more tabs and wherein a selection of the tab repositions respectively the browser instance to the foreground position.

14. The method of claim 13, wherein inspecting the one or more software messages comprises monitoring an activity of the one or more browser instances located in the background position.

* * * * *